US009537720B1

(12) United States Patent
Baggott et al.

(10) Patent No.: US 9,537,720 B1
(45) Date of Patent: Jan. 3, 2017

(54) TOPOLOGY DISCOVERY FOR FAULT FINDING IN VIRTUAL COMPUTING ENVIRONMENTS

(71) Applicant: International Business Machines Corporation, Armonk, NY (US)

(72) Inventors: Christopher J. Baggott, Chester (GB); Matthew E. Duggan, London (GB); David R. Franklin, London (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/964,812

(22) Filed: Dec. 10, 2015

(51) Int. Cl.
*G06F 11/25* (2006.01)
*H04L 12/24* (2006.01)
(Continued)

(52) U.S. Cl.
CPC .......... *H04L 41/12* (2013.01); *G06F 9/45558* (2013.01); *H04L 41/0677* (2013.01); *G06F 2009/45591* (2013.01); *G06F 2009/45595* (2013.01)

(58) Field of Classification Search
CPC . G06F 11/079; G06F 11/0712; G06F 11/0748; G06F 11/3495; G06F 11/0709; G06F 2201/81; G06F 9/45558; G06F 2009/45591; G06F 2009/45595; H04L 41/12
(Continued)

(56) References Cited

U.S. PATENT DOCUMENTS 7,120,680 B1 * 10/2006 Higgins .................. H04L 41/12
709/220
7,424,530 B2 * 9/2008 Chagoly ............. G06F 11/3466
705/7.38
(Continued)

FOREIGN PATENT DOCUMENTS

WO 2013055760 A1 4/2013

OTHER PUBLICATIONS

A. Brown, et al.,"An Active Approach to Characterizing Dynamic Dependencies for Problem Determination in a Distributed Environment", cITESEErx, Sep. 17, 2015, p. 1-14.
(Continued)

*Primary Examiner* — Alina N Boutah
(74) *Attorney, Agent, or Firm* — Cantor Colburn; Richard Wilhem

(57) ABSTRACT

Embodiments include methods of topology discovery in a virtual environment. Aspects include tracking change events, responsive to a change event, rediscovering dependencies between devices in the virtual environment and maintaining a dependency mapping between the devices. Aspects also include, responsive to a fault event, building a first topology model of the virtual environment and generating a first set of the devices which the first topology model is dependent on. Aspects also include, responsive to a resolution event, building a second topology model and generating a second set of the devices which the second topology model is dependent on. Aspects further include generating a fault device set by combining the first set and the second set, deleting any duplicate devices, and utilizing the generated fault device set to determine which of the devices are more likely to be associated with future fault events.

18 Claims, 6 Drawing Sheets

(51) Int. Cl.
*G06F 9/455* (2006.01)
*G06F 15/173* (2006.01)

(58) Field of Classification Search
USPC ....... 709/224, 223; 714/39, E11.024, 25, 26, 714/38.1, 47.1, E11.029; 370/241, 242; 718/1
See application file for complete search history.

(56) References Cited

U.S. PATENT DOCUMENTS

| | | | | |
|---|---|---|---|---|
| 7,801,703 | B2* | 9/2010 | Marvasti | G06N 99/005 702/181 |
| 7,962,590 | B1* | 6/2011 | Or | G06F 8/24 709/223 |
| 8,208,381 | B2* | 6/2012 | Kannan | G06F 11/0712 370/241 |
| 8,381,033 | B2* | 2/2013 | Franklin | G06F 11/0712 714/25 |
| 8,995,249 | B1* | 3/2015 | Roy | H04L 41/147 370/216 |
| 9,395,707 | B2* | 7/2016 | Anderson | G05B 13/0265 |
| 2002/0073338 | A1* | 6/2002 | Burrows | H04L 12/2602 726/13 |
| 2003/0046390 | A1* | 3/2003 | Ball | H04L 41/12 709/224 |
| 2004/0046785 | A1* | 3/2004 | Keller | G06F 9/5061 715/734 |
| 2004/0155899 | A1* | 8/2004 | Conrad | H04L 43/0817 715/736 |
| 2004/0218548 | A1* | 11/2004 | Kennedy | H04L 1/1685 370/254 |
| 2005/0091356 | A1* | 4/2005 | Izzo | H04L 41/0604 709/223 |
| 2008/0114581 | A1* | 5/2008 | Meir | H04L 12/66 703/13 |
| 2010/0030893 | A1* | 2/2010 | Berg | G06F 9/5061 709/224 |
| 2010/0114618 | A1* | 5/2010 | Wilcock | G06Q 10/06 705/7.37 |
| 2012/0054554 | A1* | 3/2012 | Dagan | G06F 11/0712 714/39 |
| 2012/0151026 | A1* | 6/2012 | Chen | H04L 41/12 709/223 |
| 2013/0017796 | A1* | 1/2013 | Milner | H04W 24/02 455/67.13 |
| 2013/0097183 | A1* | 4/2013 | McCracken | G06F 11/079 707/748 |
| 2013/0097304 | A1* | 4/2013 | Asthana | H04L 41/5025 709/224 |
| 2013/0205023 | A1* | 8/2013 | Bernardini | H04L 12/2602 709/224 |
| 2013/0268638 | A1* | 10/2013 | Anderson | H04L 41/12 709/220 |
| 2014/0006601 | A1* | 1/2014 | Agarwal | G06F 11/30 709/224 |
| 2014/0165054 | A1* | 6/2014 | Wang | G06F 9/45558 718/1 |
| 2014/0222745 | A1* | 8/2014 | Deng | G06N 7/005 706/47 |
| 2014/0310714 | A1* | 10/2014 | Chan | G06F 17/30598 718/102 |
| 2015/0052441 | A1* | 2/2015 | Degioanni | G06F 11/3495 715/734 |
| 2015/0058459 | A1* | 2/2015 | Amendjian | H04L 41/5058 709/223 |

OTHER PUBLICATIONS

L. Ravindranath, et al.,"Change Is Hard: Adapting Dependency Graph Models for Unified Diagnosis in Wired/Wireless Networks" ACM, Aug. 21, 2009, p. 1-10.

* cited by examiner

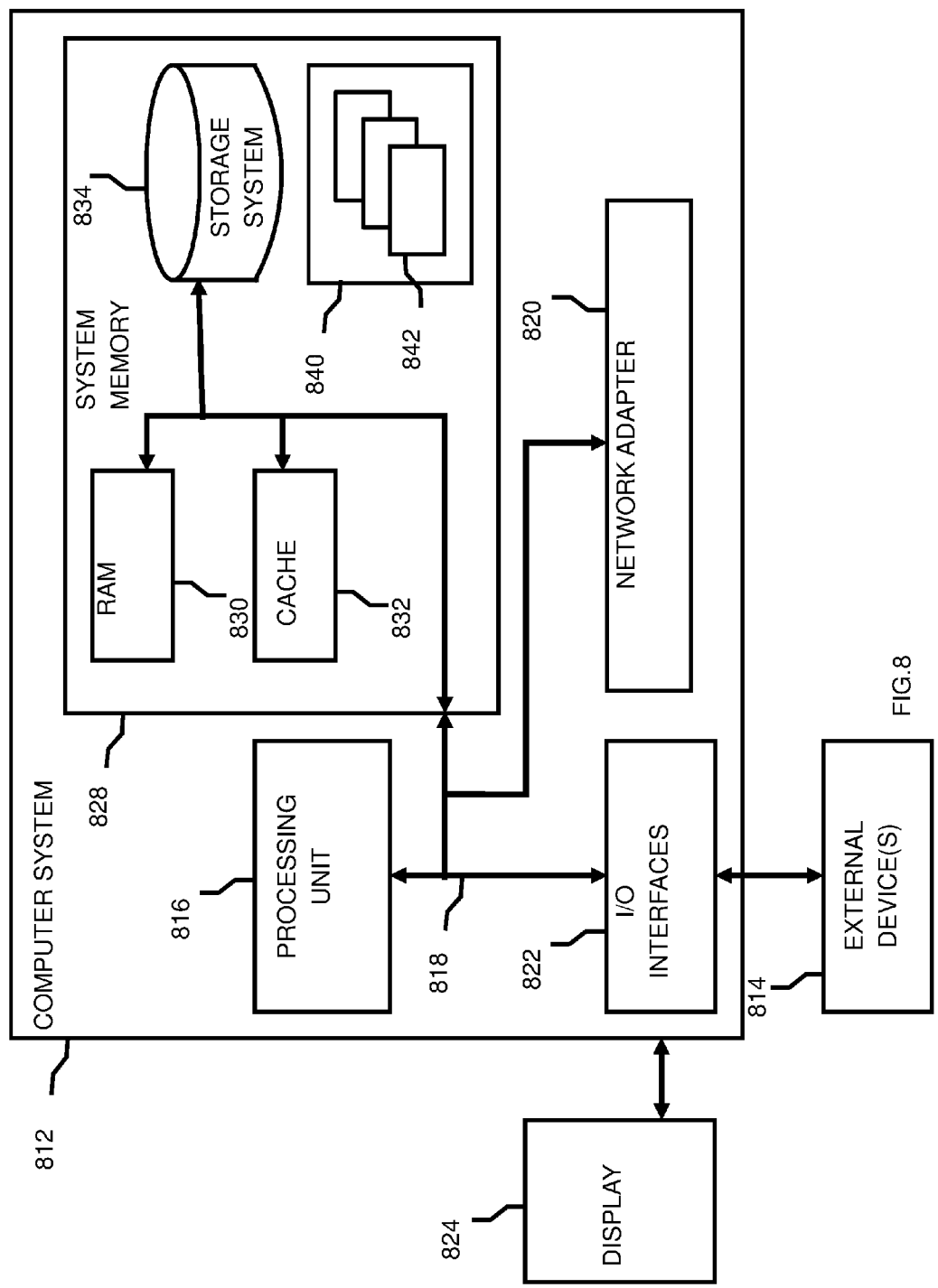

TOPOLOGY DISCOVERY FOR FAULT FINDING IN VIRTUAL COMPUTING ENVIRONMENTS

BACKGROUND

The present invention relates to topology discoveries, and more specifically to topology discovery for fault finding in virtual computing environments.

There are now a plethora of cloud based software offerings. The underlying technology for these cloud based software offerings are virtual environments such as VMware, Kernel-based Virtual Machine (KVM), XEN and Microsoft Hyper-V (VMware is a trademark of VMware, Inc. and Microsoft and Hyper-V are trademarks of Microsoft Corporation). Standard operating systems may be run on Virtual Machines (VMs). The standard operating systems are in turn used to run applications that implement a range of services. Each VM directly replicates a physical computer but is run under a hypervisor on a physical host machine that can host several VMs. This is done to maximize host machine utilization and increase fault tolerance by running VMs on a cluster of host machines. If one host machine fails then the VMs can be moved, or migrated, to run on another host machine in the cluster. Higher level software is used to automatically provision VMs in order to provide scalable services on demand. However, these higher level tools increasingly rely on the fault tolerance, load balancing and scalability of the underlying virtual environment which must adapt to meet user demands.

Large scale virtual environments often change rapidly. Typical causes of such changes are VM migration between hosts for load balancing, fault tolerance, maintenance, host standby to save power, VM High Availability and the addition or removal of VMs. In a similar way to host migration VMs can also be migrated between the shared data stores they use, although this typically occurs more slowly and less frequently than VM migration. These functions are controlled centrally and tools to automatically adapt to problem conditions talk to a control center as do traditional fault management systems.

By the time a fault is looked at by an operator the virtual environment may have already adapted to compensate for the problem making it difficult to find what caused the problem and to fix it. Further, the relationship between VM faults and the underlying physical problem is often complex and intermittent making it very difficult to find and encode this relationship heuristically. It is not possible to solely rely on a host producing the same type of error as a VM so that the physical error can be made the root cause and the VM error the symptom. Whilst the virtual environment can adapt to faults, if the root cause is not found and fixed then the overall performance of the system will continue to be effected each time a problematic component is utilized in a way that will cause it to fail.

SUMMARY

According to an embodiment of the invention, a method of topology discovery in a virtual environment, the method comprising: tracking change events in the virtual environment and responsive to a change event, rediscovering dependencies between devices in the virtual environment and maintaining a dependency mapping between the devices in the virtual environment; responsive to a fault event, building a first topology model of the virtual environment and generating a first set of the devices in the virtual environment which the first topology model is dependent on; responsive to a resolution event, building a second topology model of the virtual environment and generating a second set of the devices in the virtual environment which the second topology model is dependent on; generating a fault device set by combining the first set of the devices and the second set of the devices and deleting any of the devices which appears in both of the first set of the devices and the second set of the devices; and utilizing the generated fault device set to determine which of the devices are more likely to be associated with future fault events.

Embodiments of the invention provide a system for topology discovery in a virtual environment, the virtual environment comprising devices, the virtual environment tracking change events, generating fault events and resolution events, the system comprising: a dependency mapping between the devices in the virtual environment; a network discovery system, which: responsive to a change event, rediscovers dependencies between devices in the virtual environment and maintains the dependency mapping; responsive to a fault event, builds a first topology model of the virtual environment and generates a first set of the devices in the virtual environment which the first topology model is dependent on; responsive to a resolution event, builds a second topology model of the virtual environment and generates a second set of the devices in the virtual environment which the second topology model is dependent on; generates a fault device set by combining the first set of the devices and the second set of the devices and deleting any of the devices which appears in both of the first set of the devices and the second set of the devices; and utilizes the generated fault device set to determine which of the devices are more likely to be associated with future fault events.

Embodiments of the invention also provide a computer program product for topology discovery in a virtual environment, the computer program product comprising: a computer readable storage medium having program instructions embodied therewith, the program instructions executable by a computer to cause the computer to: track change events in the virtual environment and responsive to a change event, rediscovering dependencies between devices in the virtual environment and maintaining a dependency mapping between the devices in the virtual environment; responsive to a fault event, build a first topology model of the virtual environment and generating a first set of the devices in the virtual environment which the first topology model is dependent on; responsive to a resolution event, build a second topology model of the virtual environment and generating a second set of the devices in the virtual environment which the second topology model is dependent on; generate a fault device set by combining the first set of the devices and the second set of the devices and deleting any of the devices which appears in both of the first set of the devices and the second set of the devices; and utilize the generated fault device set to determine which of the devices are more likely to be associated with future fault events.

BRIEF DESCRIPTION OF THE DRAWINGS

Embodiments of the present invention will now be described in more detail, by way of example only, with reference to the accompanying drawings, in which:

FIG. 5 shows a flow chart of an embodiment of a method according to the present invention of building a first topology model and generating a first fault set of devices which the first topology model is dependent on;

FIG. 6 shows a flow chart of an embodiment of a method according to the present invention of building a second topology model and generating a second resolution set of devices which the second topology model is dependent on;

FIG. 8 shows a computer system in which embodiments of the present invention may be utilized.

DETAILED DESCRIPTION

A dependency mapping between all devices in a virtual environment is discovered using active agents, such as IBM Netcool/IBM Tivoli Network Manager extended for all virtual environment devices (IBM, Netcool and Tivoli are trademarks of International Business Machines Corporation). The virtual environment includes any network, host, controller or storage devices. Fault and change events from physical and virtual devices are reported to an event management system. Change events trigger localized rediscovery to keep a dependency mapping accurate and up to date. The changes to the mapping are recorded against time. The historical mapping that existed when a fault event occurred can be displayed so that a user can explore the topology and device dependency when the fault occurred.

The dependency mapping is used to discover root cause containment. This is extended by comparing the topology of the system when a fault exists and when the topology of the system has adapted to resolve the problem. This allows devices that are not problematic to be eliminated from a fault search. Multiple instances of problem data of a similar type is combined so that dependent devices that are repeatedly part of faulty topologies are highlighted. This allows a system administrator to pinpoint problem devices far more rapidly, reduce maintenance down time and improve overall system performance.

Figure 1:
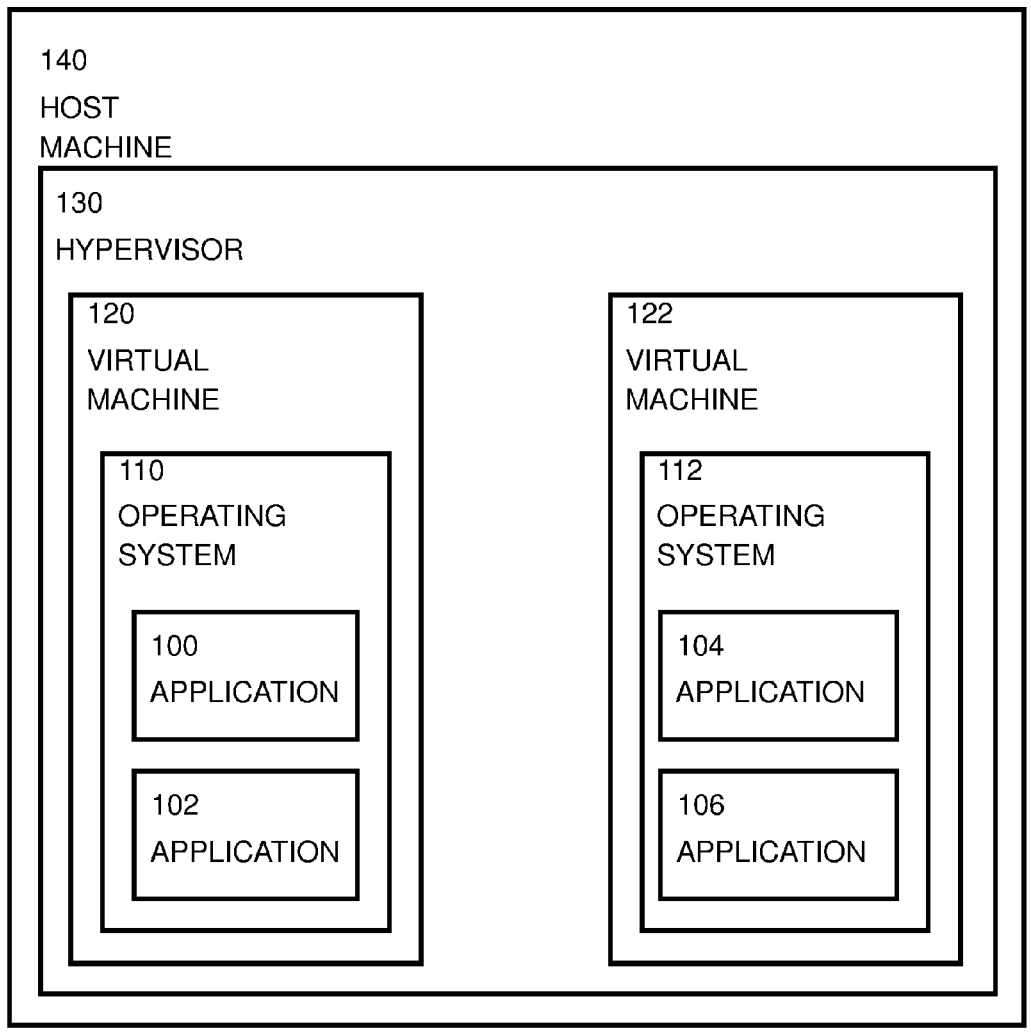
FIG. 1 shows a block diagram of a host machine with which embodiments of the present invention may be utilized

FIG. 1 shows a block diagram of a host machine with which embodiments of the present invention may be utilized. Applications 100-106 implement a range of services and run under standard operating systems 110, 112. Although two applications 100-106 are shown running under each of the standard operating systems 110, 112, embodiments of the present invention are not limited to this configuration. Any number of applications 100-106 may run under each of the operating systems 110, 112 and different numbers of applications 100-106 may run under each individual one of the standard operating systems 110, 112. Standard operating systems 110, 112 run in a virtual machine (VM) 120, 122. Each VM 120, 122 directly replicates a physical computer with each VM 120, 122 running under a hypervisor 130 on a physical host machine 140 which can host one or more VMs 120, 122.

The hypervisor 130 is typically a layer of software that allocates hardware resources dynamically and transparently. One common and widely used hypervisor in an industrial high availability environment is VMware ESX (ESX is a trade mark of VMware, Inc.). In an example embodiment, using VMware ESX hypervisor clusters, a monitor system may be used in the form of IBM Tivoli Monitor (ITM) with an agent for VMware for virtual infrastructure, such as the VMware Infrastructure (VI) agent. Other hypervisors may be used including IBM hHype, Microsoft HyperV, KVM on Linux, z/VM, and others (hHype and z/VM are trade marks of International Business Machines Corporation).

Although FIG. 1 only shows a single standard operating system 110, 112 running in each VM 120, 122, embodiments of the invention may utilize any number of operating systems 110, 112 running in each of the VMs 120, 122 and different numbers of operating systems 110, 112 may run in each one of the VMs 120, 122. Each of the operating systems 110, 112 may share hardware resources with others of the operating systems 110, 112. By encapsulating items such as a central processor, memory, operating system 110, 112 and network devices, a virtual machine 121-126 is compatible with standard operating systems 110, 112, applications 100-106, and device drivers.

Figure 2:
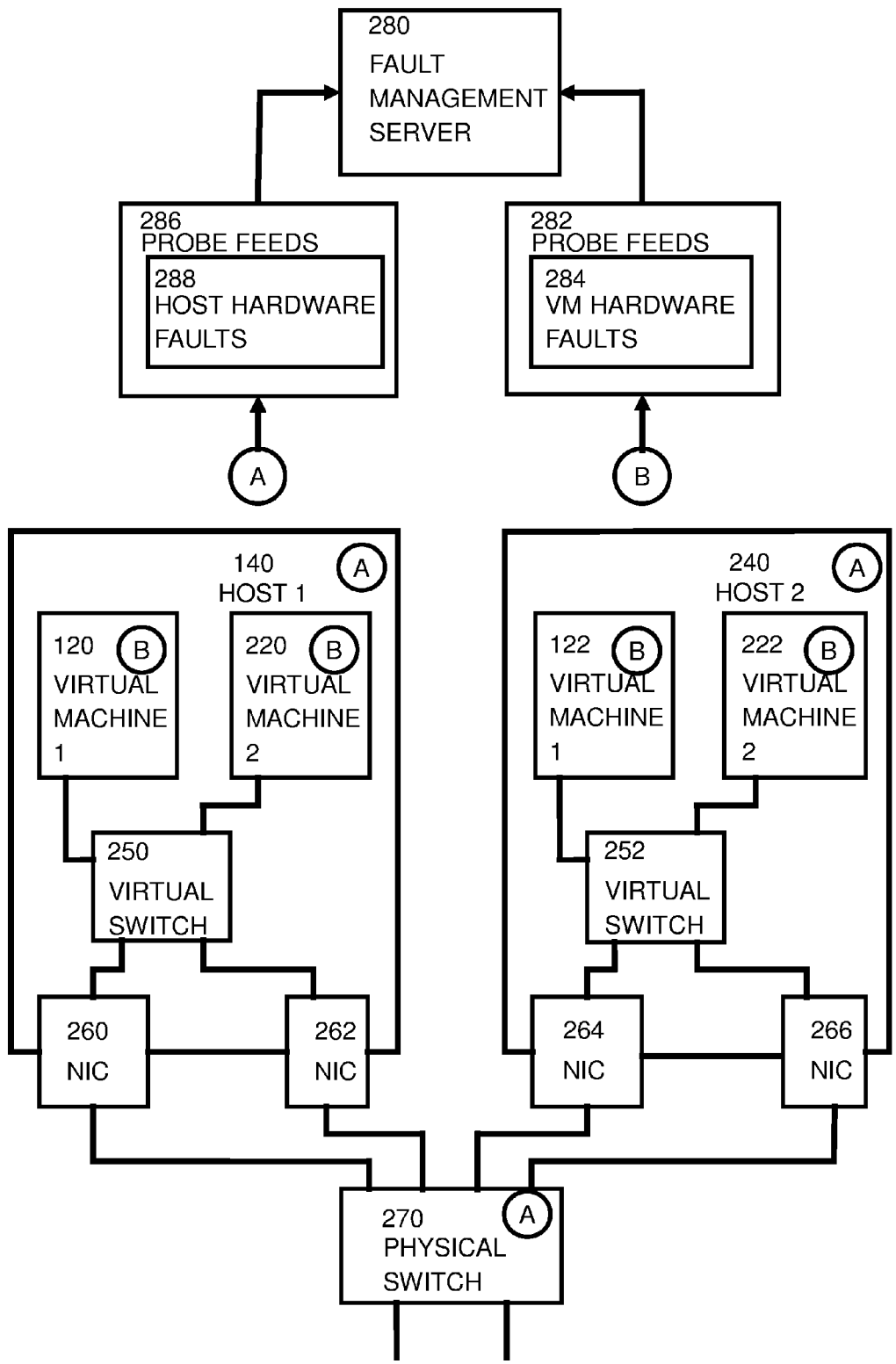
FIG. 2 shows a block diagram of a typical enterprise virtual environment in which embodiments of the present invention may be utilized

FIG. 2 shows a block diagram of a typical enterprise virtual environment in which embodiments of the present invention may be utilized. VMs 120, 122, 220, 222 are hosted on one or more physical host machines 140, 240 through hypervisors (not shown in FIG. 2) and are typically controlled centrally. The VMs 120, 122, 220, 222 communicate through virtual switches 250, 252 that connect to the host's 140, 240 Network Interface Cards (NICs) 260-266. These NICs 260-266 connect to the physical network, typically via physical switches 270. Each of the VMs 120, 122, 220, 222 also make use of hierarchical redundant storage devices (not shown in FIG. 2) that are shared between host machines 140, 240. This allows a VM 120, 122, 220, 222 to be moved between host machines 140, 240 whilst continuing to use the same storage device.

Faults may occur on VMs 120, 122, 220, 222 in a similar manner to how faults occur on physical host machines 140, 240. A fault management server 280 can be used to handling fault events in a virtual computing environment by detecting and monitoring faults and reporting them to an operator allowing rapid resolution. For example, IBM Netcool is a service level management system that collects enterprise-wide event information, including fault events, from many different network data sources. The fault management server 280 may use the object server of IBM's Netcool/OMNIbus system using Event Integration Facility (EIF) probes to feed events from the VMware VI agent (OMNIbus is a trademark of International Business Corporation). In a virtual environment, faults may be caused by faults on the hypervisor 130 that is running the VM 120, 122, 220, 222. Fault events are gathered from both a hypervisor 130 and the VMs 120, 122, 220, 222, are normalized and fed into the fault management server 280. Data is also gathered from the hypervisor 130 indicating which host machine 140, 240 each VM 120, 122, 220, 222 is running on.

The VMs 120, 122, 220, 222 run probes to provide probe feeds 282 to report VM 120, 122, 220, 222 faults 284 caused by underlying hardware failure or problems, referred to as VM hardware faults 284 to the fault management server 280. The probes in each of the VMs 120, 122, 220, 222 are denoted in FIG. 2 by the letter "B" in a circle. The host machines 140, 240 may also run probes, if these are supported by the host machines 140, 240, to provide probe feeds 286 to report host hardware faults 288 to the fault management server 280. The probes in each of the host machines 140, 240 are denoted in FIG. 2 by the letter "A" in a circle.

Physical switch 270 may, optionally, also include a probe, again denoted in FIG. 2 by the letter "A" in a circle.

The term probes is used for programs which connect to an event source such as the VM 120, 122, 220, 222 or host machine 140, 240, detect and acquire event data and forward the event data to the fault management server 280 as alerts. Probes may use the logic specified in a rules file to manipulate the event elements before converting them into the fields of an alert in a fault management server 280 alerts status table. Each probe may be designed to acquire event data from a specific source. Probes may also be referred to as monitoring devices or agents for remotely or directly monitoring network devices. For example, VMs 120, 122, 220, 222 and host machines 140, 240 may run standard OMNIbus probes if they are Linux based or run on OMNIbus supported platforms (Linux is a trade mark of Linus Torvalds). VMware ESX hypervisors are Linux based and therefore may run standard OMNIbus probes.

In an alternative embodiment, the probes may be run on a remote machine and monitor the hypervisor machine 140, 240 via a network protocol or remote mount. A probe or monitor is used to feed these events to the fault management server 280. Situation events keep track of which VM 120, 122, 220, 222 is on which host machine 140, 240 and also report host hardware faults 288. Additionally, if the host machines 140, 240 support probes, host hardware faults 288 may be fed direct to the fault management server 280. If the host hardware faults 288 can be fed via probes directly to the fault management system the probes can be used to gather a richer set of potential errors direct from the host machines 140, 240.

The hypervisor (130 in FIG. 1) may directly report all changes such as VM 120, 122, 220, 222 movements to a network management system (not shown). This allows the network management system to keep track of which VM 120, 122, 220, 222 resides on which host machine 140, 240 and to also provide simple correlation and containment when a single point of failure causes similar faults to be reported by both physical and virtual devices. However, in many cases a problem is compensated for before all the affected devices report faults and a resolution event will downgrade the severity of the fault event that was reported. For example, a VM 120, 122, 220, 222 may display sluggish response, memory faults and high CPU usage because of some types of intermittent fault on the host machine 140, 240 such as paging memory to an overloaded disk. When the control center moves the VM 120, 122, 220, 222 to another host machine 140, 240 as a result of detecting the high CPU usage then the only symptoms might be temporary service level and VM 120, 122, 220, 222 memory faults that are then resolved and a disk loading fault that also resolves after the move. Another VM 120, 122, 220, 222 could then experience a similar problem if it happens to use enough memory to cause paging to the same disk in the datastore.

Figure 3:
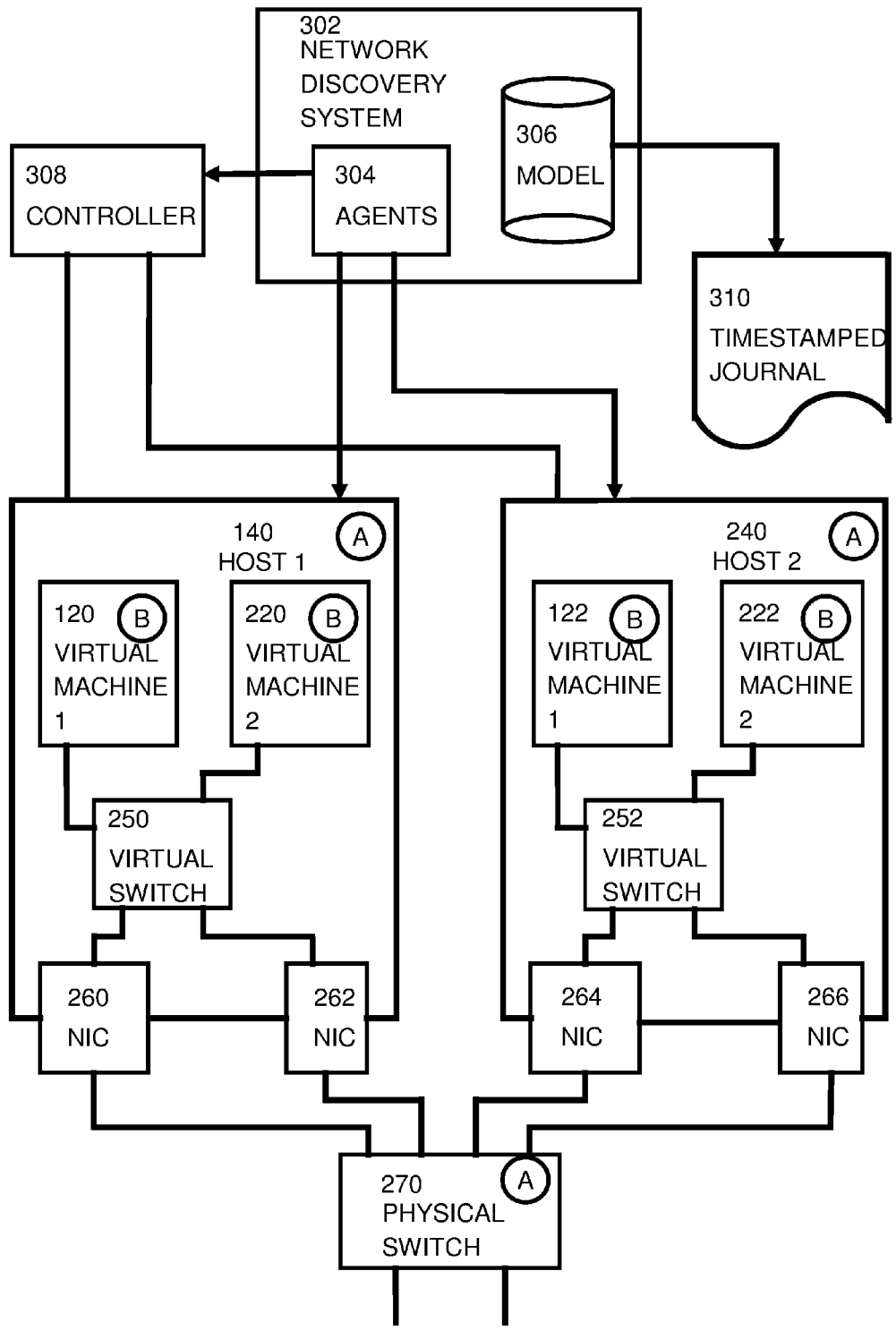
FIG. 3 shows a block diagram of an embodiment of a system according to the present invention.

Referring to FIG. 3, network discovery system 302 uses the network topology to find related and dependent devices. Storage dependency relationships must also be discovered and included in the topology model 306. Fiber channel and storage discovery agents and probes may also be required. Standard network discovery system 302 containment/dependence and root cause analysis may be augmented for datastore as well as network dependence. As well as the standard network view there may also be a data store view that show the mapping of VM 120, 122, 220, 222 disk to layers of physical redundant disk array devices to physical drives. Disk loading and latency also needs to be considered as excessive loading can be a root cause of VM performance issues. Loading data is provided by most storage management systems and simple thresholding can be used to translate this into error events, such as OMNIbus error events. In the same way as host machine 140, 240 changes trigger network re-discovery, disk migrations change storage dependency and are discovered and recorded. This datastore hierarchy is used to find the root cause of disk load problems as well as device failures. For example, most datastores can cope with a failed disk but performance can be degraded.

Network discovery system 302 model database 306 is changed to reflect the new network layout and so maintain the model database 306 that includes a mapping of the dependencies. This model database 306 outputs a timestamped journal file 310 when each change occurs along with full topology check points when under low load. This allows the topology of virtual and physical components to be rebuilt based on the timestamp of error events. A user can then display the physical and virtual network at the time an error occurred in order to help find where and why the problem occurred.

Figure 4:
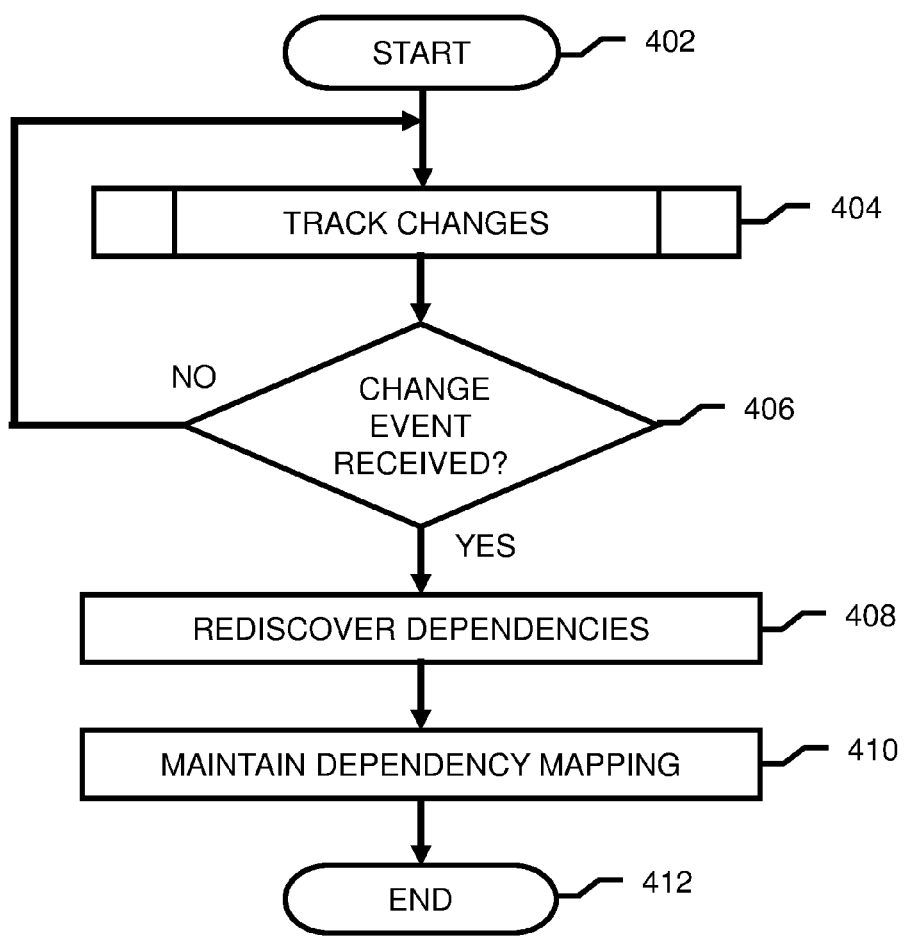
FIG. 4 shows a flow chart of an embodiment of a method according to the present invention of tracking change events, rediscovering dependencies and maintaining a dependency mapping for use in the system of FIG. 3.

Referring to FIG. 4 which shows a flow chart of an embodiment of a method according to the present invention of tracking change events, rediscovering dependencies and maintaining a dependency mapping for use in the system of FIG. 3. The method starts at step 402. At step 404, changes to physical and virtual devices are tracked by being forwarded by the network management system to a network discovery system 302, such as, for example, the IBM Tivoli Network Manager (ITNM). This includes network, host, controller and storage devices. At step 406, a check is made as to whether a change event has been received. If no change event has been received, then processing returns to step 404. If a change event has been received, then processing proceeds to step 408.

At step 408, the received change event triggers a focused localized rediscovery of the network topology by the network discovery system 302. This results in the approximately simultaneous triggering of network discovery system 302 agents 304 for devices that are effected by the change. For example, a VM 120, 122, 220, 222 moved between host machines 140, 240 will now connect to the network through a new virtual switch 270 and physical NIC 260-266 and a configuration of supported VLANs will change. Embodiments of the invention use basic heuristics to make this process more efficient, for example, a host machine 140, 240 going down will mean that all VMs 120, 122, 220, 222 on it need to move, many will move together to the same host machine 140, 240, so each host machine 140, 240 is queried only once for all changes once the appropriate migrations are complete. Preferably, agents 304 talk directly to the hypervisor 130 hosts to increase the speed at which the new network topology is established. Traditional software for augmenting virtual environments works through the controller 308 alone which means it can become heavily loaded and slow.

The use of active agents 304 allows additional details to be gathered about the VMs 120, 122, 220, 222 and how they are hosted. This information is then fed back into the network management system to enrich the events. This allows the network management system to correlate VMs 120, 122, 220, 222 to host machines 140, 240 even when a different host name is used by the hypervisor 130 software to the one used internally by the VM 120, 122, 220, 222.

At step 410, as network topologies change, the network discovery system 302 model database 306 is changed to reflect the new network layout and to maintain the model database 306 that includes a mapping of the dependencies.

This model database 306 outputs a timestamped journal file 310 when each change occurs along with full topology check points when under low load. This allows the topology of virtual and physical components to be rebuilt based on the timestamp of error events. A user can then display the physical and virtual network at the time an error occurred in order to help find where and why the problem occurred. The method ends at step 412.

Figure 5:
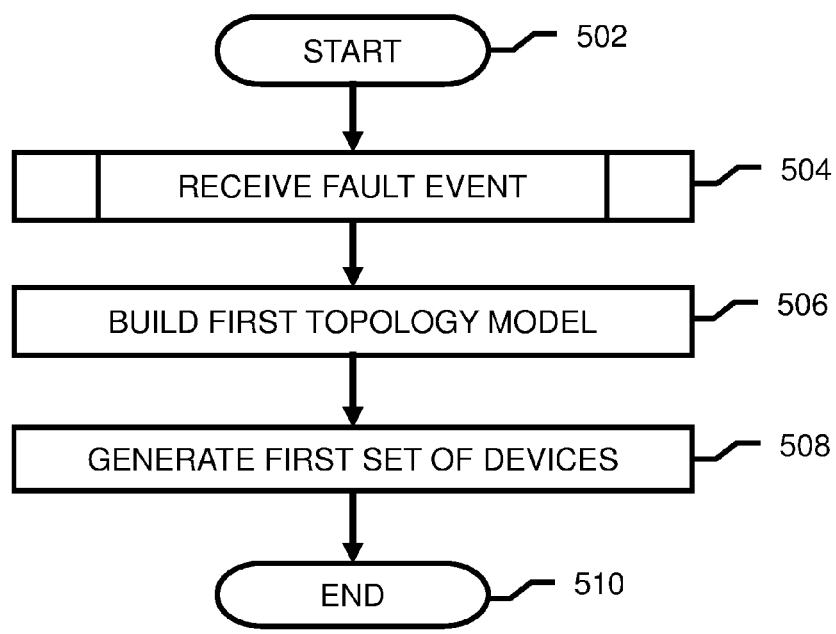

FIG. 5 shows a flow chart of an embodiment of a method according to the present invention of building a first topology model and generating a first set of devices which the first topology model is dependent on. The method starts at step 502. At step 504, a fault event is received. At step 506, after receipt of the fault event for part of the virtual environment, a first topology in the model database 306 is built for that point in time. At step 508, the devices on which the virtual environment depends on are found. This first set of devices is the fault device set, that is those devices on which the virtual environment was dependent on at the time of the fault event. The method ends at step 510.

Figure 6:
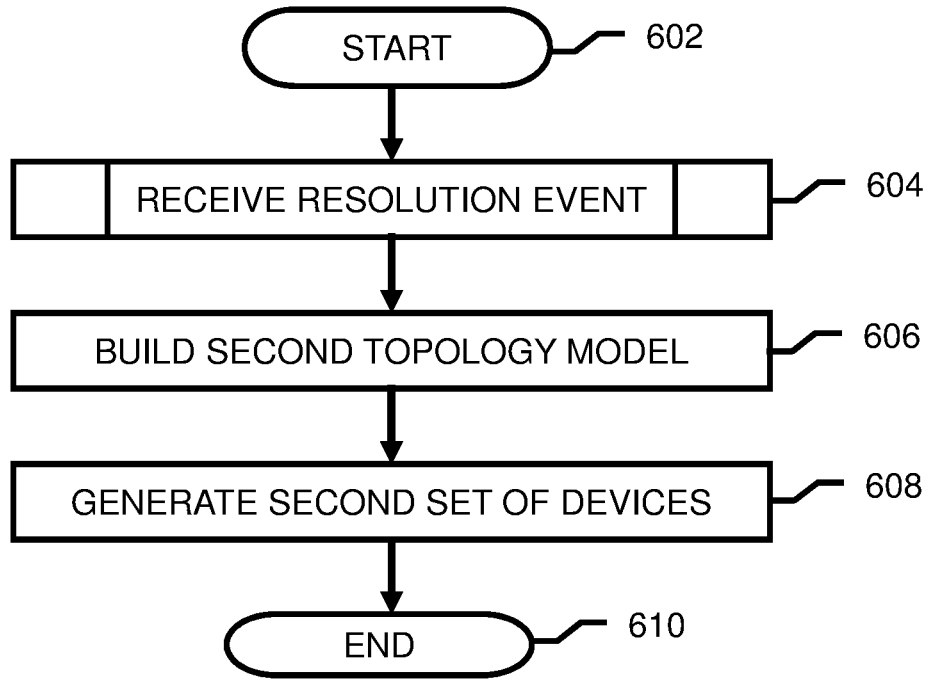

FIG. 6 shows a flow chart of an embodiment of a method according to the present invention of building a second topology model and generating a second set of devices which the second topology is dependent on. The method starts at step 602. At step 604, a resolution event is received. At step 606, after receipt of the resolution event, a second topology in the model database is built for that point in time. At step 608, the devices on which the virtual environment depends on are found. This second set of devices is the resolution device set, which is those devices on which the virtual environment is dependent on after resolution of the fault event. The method ends at step 610.

Figure 7:
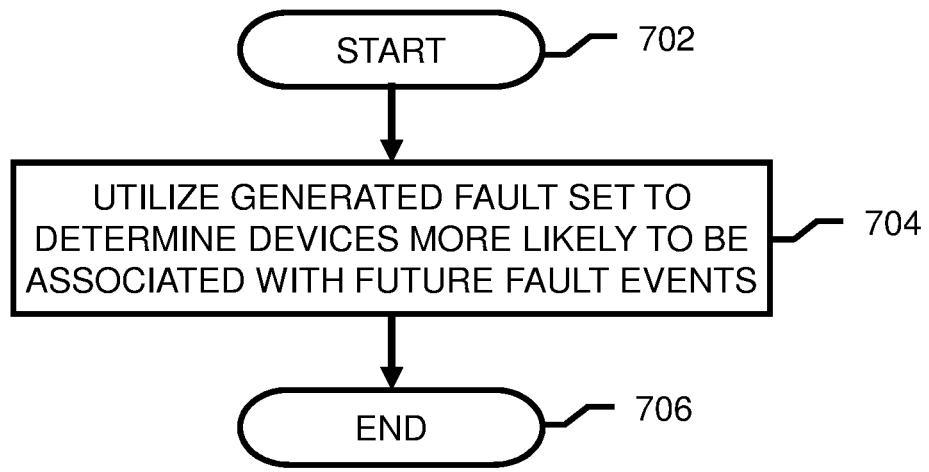
FIG. 7 shows a flow chart of an embodiment of a method according to the present invention of generating a fault device set.

FIG. 7 shows a flow chart of an embodiment of a method according to the present invention of generating a likely fault device. The method starts at step 702.

At step 704, the generated first fault set of devices is compared with the generated second resolution set of devices. Any devices that are in both the first fault set of devices and the second resolution set of devices are removed from the first fault set of devices. This is because the resolution event indicated the set of devices which functions satisfactorily without the fault. If the second resolution set of devices includes a device, then that device did not contribute to the fault. The devices that remain in the first fault set of devices did not appear in the second resolution set and so they may have contributed to the fault. The method ends at step 706.

Each physical and virtual device in the overall system may be given a Potential Problem Score (PPS). In an embodiment, the PPS starts at zero and may be reset to zero by the user when required. Inclusion of the device in a first fault device set is used to increment the device's PPS. In other embodiments the score may start at any other value and/or may be decremented if it is included in a first fault device set. The more occasions on which a given device is included in a first fault device set, the greater the PPS becomes. Embodiments of the invention can also cope with the situation where a resolution event comes in after the original fault device set has incremented the PPS for a device. The first fault device set is stored for unresolved faults and if a resolution event comes in later the set of common dependent devices is used to decrement (or increment) the device's PPS appropriately.

A graphical user interface may be used to display the network and model datastore 306 views. The PPS may be used to highlight the devices that are most likely to have problems. In this way a user responsible for maintaining the virtual environment can find problem areas and correct them much more rapidly. This results in higher overall system performance and less degradation of performance during maintenance periods as fewer devices need to be taken offline to investigate potential problems.

Referring now to FIG. 8, a schematic of an example of computing system is shown. Computing system 812 is only one example of a suitable computing system and is not intended to suggest any limitation as to the scope of use or functionality of embodiments of the invention described herein. Regardless, computing system 812 is capable of being implemented and/or performing any of the functionality set forth hereinabove.

Computer system/server 812 is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 is shown in the form of a general-purpose computing device. The components of computer system/server 812 may include, but are not limited to, one or more processors or processing units 816, a system memory 828, and a bus 818 that couples various system components including system memory 828 to processor 816. Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 812 typically includes a variety of computer system readable media. Such media may be any available media that is accessible by computer system/server 812, and it includes both volatile and non-volatile media, removable and non-removable media. System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of topology discovery in a virtual environment, the method comprising:
   tracking change events in said virtual environment and responsive to a change event, rediscovering dependencies between devices in said virtual environment;
   maintaining a dependency mapping between said devices in said virtual environment;
   responsive to a fault event, building a first topology model of said virtual environment and generating a first set of said devices in said virtual environment which said first topology model is dependent on;
   responsive to a resolution event, wherein the resolution event resolves the fault event, building a second topology model of said virtual environment and generating a second set of said devices in said virtual environment which said second topology model is dependent on after the resolution of the fault event;
   generating a fault device set by combining said first set of said devices and said second set of said devices and deleting any of said devices which appears in both of said first set of said devices and said second set of said devices; and
   displaying, via a graphical user interface, the generated device set to determine which of said devices are more likely to be associated with future fault events.

2. The method of claim 1, wherein each device in said virtual environment is associated with a score according to how many fault device sets it has appeared in.

3. The method of claim 1, wherein fault events are generated in response to faults in virtual machines and host machines.

4. The method of claim 1, wherein the fault events in virtual machines are generated by probes running on the virtual machines.

5. The method of claim 1, wherein the fault events in host machines are generated by probes running on the host machines.

6. The method of claim 1, wherein said dependency mapping comprises a timestamped journal.

7. A system for topology discovery in a virtual environment, the virtual environment comprising devices, the virtual environment tracking change events, generating fault events and resolution events, the system comprising:
   a dependency mapping between said devices in said virtual environment;
   a network discovery system, which:
     responsive to a change event, rediscovers dependencies between devices in said virtual environment and maintains said dependency mapping;
     responsive to a fault event, builds a first topology model of said virtual environment and generates a first set of said devices in said virtual environment which said first topology model is dependent on;
     responsive to a resolution event, wherein the resolution event resolves the fault event, builds a second topology model of said virtual environment and generates a second set of said devices in said virtual environment which said second topology model is dependent on after the resolution of the fault event;
     generates a fault device set by combining said first set of said devices and said second set of said devices and deleting any of said devices which appears in both of said first set of said devices and said second set of said devices; and
     displays, via graphical user interface, the generated fault device set to determine which of said devices are more likely to be associated with future fault events.

8. The system of claim 7, wherein each device in said virtual environment is associated with a score according to how many fault device sets it has appeared in.

9. The system of claim 7, wherein fault events are generated by the virtual environment in response to faults in virtual machines and host machines.

10. The system of claim 7, wherein the fault events in virtual machines are generated by probes running on the virtual machines.

11. The system of claim 7, wherein the fault events in host machines are generated by probes running on the host machines.

12. The system of claim 7, wherein said dependency mapping comprises a timestamped journal.

13. A computer program product for topology discovery in a virtual environment, the computer program product comprising:

a computer readable storage medium having program instructions embodied therewith, the program instructions executable by a computer to cause the computer to:

track change events in said virtual environment and responsive to a change event, rediscovering dependencies between devices in said virtual environment and maintaining a dependency mapping between said devices in said virtual environment;

responsive to a fault event, build a first topology model of said virtual environment and generating a first set of said devices in said virtual environment which said first topology model is dependent on;

responsive to a resolution event, wherein the resolution event resolves the fault event, build a second topology model of said virtual environment and generating a second set of said devices in said virtual environment which said second topology model is dependent on after the resolution of the fault event;

generate a fault device set by combining said first set of said devices and said second set of said devices and deleting any of said devices which appears in both of said first set of said devices and said second set of said devices; and display, via a graphical user interface, the generated fault device set to determine which of said devices are more likely to be associated with future fault events.

14. The computer program product of claim 13, wherein each device in said virtual environment is associated with a score according to how many fault device sets it has appeared in.

15. The computer program product of claim 13 wherein fault events are generated in response to faults in virtual machines and host machines.

16. The computer program product of claim 13, wherein the fault events in virtual machines are generated by probes running on the virtual machines.

17. The computer program product of claim 13, wherein the fault events in host machines are generated by probes running on the host machines.

18. The computer program product of claim 13, wherein said dependency mapping comprises a timestamped journal.

\* \* \* \* \*